US007707293B2

(12) United States Patent
Zhang

(10) Patent No.: US 7,707,293 B2
(45) Date of Patent: Apr. 27, 2010

(54) METHOD, SYSTEM AND APPARATUSES FOR TRANSFERRING SESSION REQUEST

(75) Inventor: Tao Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 505 days.

(21) Appl. No.: 11/680,634

(22) Filed: Mar. 1, 2007

(65) Prior Publication Data
US 2007/0204048 A1 Aug. 30, 2007

Related U.S. Application Data

(63) Continuation of application No. PCT/CN2006/001305, filed on Jun. 13, 2006.

(30) Foreign Application Priority Data

Sep. 27, 2005 (CN) ............ 2005 1 0105753

(51) Int. Cl.
G06F 15/16 (2006.01)

(52) U.S. Cl. .............. 709/227; 709/238; 709/237; 709/239; 370/328; 370/331; 370/338; 370/352; 370/392; 370/401; 455/411

(58) Field of Classification Search .......... 709/227, 709/237–239; 370/328, 331, 338, 352, 392, 370/401; 455/411
See application file for complete search history.

(56) References Cited

U.S. PATENT DOCUMENTS 7,304,974 B2 * 12/2007 Yang et al. ............ 370/338
7,525,937 B2 * 4/2009 O'Neill ............ 370/328
2002/0141404 A1 10/2002 Wengrovitz
2003/0193952 A1 * 10/2003 O'Neill ............ 370/392
2004/0105431 A1 * 6/2004 Monjas-Llorente et al. . 370/352
2004/0157585 A1 * 8/2004 Sashihara ........... 455/411
2005/0190734 A1 9/2005 Khalil et al.
2006/0077924 A1 * 4/2006 Rune ............ 370/328

FOREIGN PATENT DOCUMENTS

JP 2005-175522 A 6/2005
WO 01/24476 A1 4/2001
WO 2005/086462 A1 9/2005

OTHER PUBLICATIONS

Tiebing Xie, et al.; "A generic way for wireline and wireless access authentication"; Communication Technology Proceedings, 2003; ICCT 2003; International Conference on Apr. 9-11, 2003; Piscataway, NJ, USA; IEEE; vol. 1, Apr. 9, 2003; pp. 86-89; XP010643548; ISBN: 7-5635-0686-1.
Supplementary Eureopean Search Report for European Patent Application No. 06742165.1, dated Jan. 15, 2008.
Chinese Office Action for Chinese Application No. 200510105753. X, dated Apr. 10, 2009, and English translation thereof.

* cited by examiner

Primary Examiner—Wing F Chan
Assistant Examiner—Hitesh Patel

(57) ABSTRACT

A method for transferring a session request including: acquiring a routing table related to a session during establishing the session; the routing table recording the address information of an AAA proxy server related to the session; transferring a session request of the session according to the address information of the AAA servers recorded in the routing table upon receiving the session request of the session. A system and a plurality of apparatuses for transferring a session request are provided as well. By the solution, all session requests of the session may be ensured to be transferred via the same route.

25 Claims, 4 Drawing Sheets

METHOD, SYSTEM AND APPARATUSES FOR TRANSFERRING SESSION REQUEST

CROSS-REFERENCE TO RELATED APPLICATIONS

This application is a continuation of International Application No. PCT/CN2006/001305 filed on Jun. 13, 2006. This application claims the benefit of Chinese Patent Application No. 200510105753.X filed on Sep. 27, 2005. The disclosures of the above applications are incorporated herein by reference.

FIELD

The present disclosure relates to the field of mobile communication technology, and particularly to a method, a system and apparatuses for transferring a session request.

BACKGROUND

The statements in this section merely provide background information related to the present disclosure and may not constitute prior art.

At present, the 3G network (The Third Generation Network) is gradually evolving into a full IP network. Not only network entities supporting IP are used in the core network and IP based techniques are used in the access network, terminals also become IP clients that may be activated. In the 3G network, a terminal may move in home network, or roam to a network of other operators. No matter whether the terminal roams, when the terminal accesses a network and uses the services provided by the operator, the network side will execute a strict AAA (Authentication, Authorization and Accounting) procedure to the terminal, i.e. authenticating the terminal accessed first, and verifying the validity of the terminal identity; authorizing the terminal appropriate right according to the type of the service applied by the terminal after the authentication is completed; and finally charging according to the resources occupied by the terminal.

FIG. 1 is a conventional flowchart illustrating the process of transferring a session establishment request. Referring to FIG. 1, suppose that there is one intermediate network between a visited network of a terminal and a home network of the terminal, in the related art, when the terminal roams and needs to establish a session connection, the process of transferring the session establishment request by network nodes is implemented by randomly selecting AAA proxy servers of the networks, which comprises the following steps:

Step 101: an AAA client in a WLAN (Wireless local network) access network of the visited network of a terminal receives a session establishment request sent from the terminal.

Step 102: the AAA client randomly selects a first AAA proxy server from the AAA servers of the visited network, and sends the session establishment request to the first AAA proxy server.

Step 103: the first AAA proxy server selects a second AAA proxy server from the AAA servers of the intermediate network, and sends the session establishment request to the second AAA proxy server.

Step 104: the second AAA proxy server selects a destination AAA server from the AAA servers of the home network of the terminal, and sends the session establishment request to the destination AAA server.

After a session connection is established via the above process as shown in FIG. 1, if the terminal initiates other related requests of this session, such as a session termination request, in the WLAN access network of the visited network during the session or at the end of the session, network nodes will send the session termination request to the destination AAA server of the home network of the terminal by randomly selecting AAA proxy servers as well. That is, the AAA client of the visited network selects a third AAA proxy server from the AAA servers of the visited network, and sends the session establishment request to the third AAA proxy server; the third AAA proxy server selects a fourth AAA proxy server from the AAA servers of the intermediate network, and sends the session establishment request to the fourth AAA proxy server; the fourth proxy server sends the session termination request to the destination AAA server.

It can be seen from the above descriptions, in the related art, if a terminal roams, the network side needs to randomly select AAA proxy servers of the network for transferring each session request of the same session of the terminal. For example, for each session request, the AAA client needs to randomly select an AAA proxy server of the visited network of the terminal; the selected AAA proxy server also needs to randomly select an AAA proxy server of the intermediate network. In this way, it can not be ensured that all the session requests related to one session are transferred via the same AAA proxy servers. For example, in the aforesaid process, the session establishment request is transferred by the first AAA proxy server of the visited network and the second proxy server of the intermediate network; the subsequent session termination request, however, is transferred by the third AAA proxy server of the visited network and the fourth AAA proxy server of the intermediate network. The first and third AAA proxy servers as well as the second and fourth AAA proxy servers are usually not the same. Thus, in the related art, different AAA proxy servers are used to transfer different session requests of the same session.

The inventor of the present invention found in the inventing process that, since an AAA proxy server needs to constantly modify the session state maintained by the AAA proxy server according to the received session request, if different AAA proxy servers are used for transferring different session requests of the same session, each AAA proxy server will be unable to maintain a correct session state, which may cause a series of problems such as errors in charging and errors in IP access control. For example, in the visited network, the first AAA proxy server is selected for transferring the session establishment request, and the first AAA proxy server will create the session correspondingly. However, for the session termination request transfer, the third AAA proxy server of the network is used. Since the session termination request is not transferred by the first proxy server, the first AAA proxy server may not obtain the information on the session termination, and thus will not convert the state of the session into termination and will not end the processing of the created session, which may cause a series of problems such as errors in charging and errors in IP access control.

SUMMARY

Embodiments of the present invention provide a method for transferring a session request, which may ensure all requests of a session to be transferred via same AAA servers.

The technical solution in accordance with the present invention is as follows:

A method for transferring a session request includes:

acquiring routing information of a session;

transferring a session request of the session according to the routing information.

The routing information of the session includes:

address information of an Authentication, Authorization and Accounting (AAA) proxy server corresponding to a request of the session.

The step of acquiring the routing information includes:

acquiring the address information of the AAA proxy server corresponding to the session by transferring a session establishment request of the session;

and the session request of the session is a session request transferred following the session establishment request during the session.

The step of acquiring the routing information includes:

sending, by an AAA client of a visited network of a terminal, the session establishment request received from the terminal to a first AAA proxy server selected from the visited network of the terminal;

writing, by the first AAA proxy server, address information of the first AAA proxy server in the session establishment request, and sending the session establishment request to a destination AAA server selected from a home network of the terminal;

acquiring, by the destination AAA server of the home network of the terminal, the address information of the first AAA proxy server from the session establishment request;

sending, by the destination AAA server of the home network of the terminal, the address information of the first AAA proxy server to the AAA client of the visited network of the terminal;

the step of transferring the session request of the session according to the routing information includes:

sending, by one party of the destination AAA server of the home network of the terminal and the AAA client of the visited network of the terminal, the session request of the session to the first AAA proxy server of the visited network of the terminal according to the address information of the first AAA proxy server of the visited network of the terminal;

sending, by the first AAA proxy server of the visited network of the terminal, the session request of the session to the other party of the destination AAA server of the home network of the terminal and the AAA client of the visited network of the terminal.

The first party is the AAA client of the visited network of the terminal; the second party is the destination AAA server of the home network of the terminal;

in the process of transferring the session request of the session, the address information which the AAA client of the visited network of the terminal takes as a foundation is the address information of the first AAA proxy server of the visited network of the terminal is that received by the AAA client of the visited network of the terminal.

The step of sending the address information of the first AAA proxy server of the visited network of the terminal to the AAA client of the visited network of the terminal includes:

sending, by the destination AAA server of the home network of the terminal, the address information of the first AAA proxy server by appending the address information of the first AAA proxy server in one of a session establishment response and other self-defined messages to the AAA client of the visited network of the terminal.

The method further includes:

an intermediate network between the visited network of the terminal and the home network of the terminal;

the step of sending the session establishment request to the destination AAA server of the home network of the terminal including:

sending, by the first AAA proxy server, the session establishment request to an AAA proxy server selected from the intermediate network;

writing, by the AAA proxy server of the intermediate network, address information of the AAA proxy server of the intermediate network in the session establishment request, and sending the session establishment request to the destination AAA server of the home network of the terminal;

the process of acquiring the address information of the first AAA proxy server from the session establishment request including:

acquiring, by the destination AAA server of the home network of the terminal, the address information of the AAA proxy server of the intermediate network from the session establishment request;

the process of sending the session request of the session to the second party further including:

sending, by the first party, the session request of the session to the AAA proxy server of the intermediate network according to the address information of the AAA proxy server of the intermediate network.

The first party is the destination AAA server of the home network of the terminal and the second party is the AAA client of the visited network of the terminal;

the step of sending the session request of the session according to the address information of the AAA proxy server of the intermediate network includes:

sending, by the destination AAA server of the home network of the terminal, the session request of the session containing the address information of the first AAA proxy server of the visited network of the terminal to the AAA proxy server of the intermediate network according to the address information of the AAA proxy server of the intermediate network;

sending, by the AAA proxy server of the intermediate network, the session request of the session to the first AAA proxy server of the visited network of the terminal according to the address information of the first AAA proxy server of the visited network of the terminal contained in the session request of the session.

The method further includes:

sending, by the destination AAA server of the home network of the terminal, the address information of the first AAA proxy server of the visited network of the terminal and the address information of the AAA proxy server of the intermediate network to the AAA client of the visited network of the terminal;

the first party is the AAA client of the visited network of the terminal and the second party is the destination AAA server of the home network of the terminal;

the step of sending, by the first party, the session request of the session to the first AAA proxy server including:

sending, by the AAA client of the visited network of the terminal, to the first AAA proxy server of the visited network of the terminal, the session request of the session containing the address information of the AAA proxy server of the intermediate network;

the step of sending the session request of the session according to the address information of the AAA proxy server of the intermediate network including:

sending, by the first AAA proxy server of the visited network of the terminal, the session request of the session to the AAA proxy server of the intermediate network according to the address information of the AAA proxy server of the intermediate network contained in the session request of the session, and sending, by the AAA proxy server of the intermediate network, the session request of the session to the destination AAA server of the home network of the terminal.

The step of writing the address information of the AAA proxy server of the intermediate network in the session establishment request includes:

writing the address information of the AAA proxy server of the intermediate network in the session establishment request according to a write-in rule.

The write-in rule is writing in successively in forward order;

the step of writing the address information of the AAA proxy server of the intermediate network in the session establishment request includes:

writing, by the AAA proxy server of the intermediate network, the address information of the AAA proxy server of the intermediate network at the location that follows the address information of the first AAA proxy server in the session establishment request.

The method further includes:

sending, by the destination AAA server of the home network of the terminal, to the AAA proxy server of the intermediate network all the address information from that of the first AAA proxy server to that of the AAA proxy server of the intermediate network;

saving, by the AAA proxy server of the intermediate network, the address information of the AAA proxy server of the intermediate network to a last record as a routing table of the AAA proxy server of the intermediate network to the destination AAA server, and saving the address information of the AAA proxy server of the intermediate network to a first record as a routing table of the AAA proxy server of the intermediate network to the terminal side, and then sending to the first AAA proxy server all the address information from that of the first AAA proxy server to that of the AAA proxy server of the intermediate network;

saving, by the first AAA proxy server, the address information of the first AAA proxy server to the last record as a routing table of the first AAA proxy server to the destination AAA server, and saving the address information of the first AAA proxy server to the last record as a routing table of the first AAA proxy server to the terminal side;

the step of transferring the session request of the session according to the routing information including:

if the AAA proxy server of the intermediate network or the first AAA proxy server of the visited network of the terminal initiates a subsequent request of the session to the terminal, sending the subsequent request of the session to the terminal side according to the routing table of the AAA proxy server of the intermediate network to the terminal side or the routing table of the first AAA proxy server of the visited network of the terminal to the terminal side respectively;

if the AAA proxy server of the intermediate network or the first AAA proxy server initiates a subsequent request of the session to the destination AAA server of the home network of the terminal, sending the subsequent request of the session to the destination AAA server of the home network of the terminal according to the routing table of the AAA proxy server of the intermediate network to the destination AAA server of the home network of the terminal or the routing table of the first AAA proxy server of the visited network of the terminal to the destination AAA server respectively.

The method further includes:

maintaining, by the AAA proxy server corresponding to the session, session state of the session according to the session request of the session and making corresponding service processing according to the session state of the session.

The method further includes:

setting a route parameter in the session establishment request;

the step of writing address information in the session establishment request including:

writing address information in the segments corresponding to the route parameter in the session establishment request;

the process of acquiring address information including:

acquiring the address information from the segments corresponding to the route parameter in the session establishment request.

The method further includes:

upon receiving the routing information of the session, transferring all session requests of another session according to the routing information, and the session and another session relates to the same visited network and home network of the terminal.

The method further includes:

setting, at any AAA client, a routing table of an AAA client to a destination AAA server in another network, and the routing table records address information of AAA proxy servers from the AAA client to the destination AAA server in another network;

the step of acquiring the routing information of the session includes:

acquiring, by the AAA client, the routing table set in the AAA client upon receiving the session request of the session sent from a terminal and aimed at the destination AAA server;

the step of transferring the session request of the session according to the routing information includes:

sending, by the AAA client, the session request of the session containing the routing table, to the AAA proxy server according to the address information of the AAA proxy servers recorded in the routing table; and determining, by the AAA proxy server, the route for sending the session request up to the destination AAA server according to the routing table contained in the session request of the session.

Type of the session request of the session includes one of a Diameter protocol and a remote authentication dial-in user service Radius protocol.

It may be concluded from the aforesaid that embodiments of the present invention has the following advantages:

In accordance with some embodiments of the present invention, routing table is formed according to the route for transferring the session establishment request, and the subsequent requests related to the session are all transferred according to the routing table so as to ensure that all the requests of the same session to be transferred via same AAA proxy servers, thereby allowing the AAA proxy servers to maintain a correct session state according to the session request, and thus make correct service processing corresponding to the session, such as correct charging, correct IP access control and the like.

In accordance with the routing method for the same session as proposed in embodiments of the present invention, processing routing according to the routing table. No matter how many AAA proxy servers are in a network, all the requests related to one session may be ensured to be transferred by the same AAA proxy server of the network, thereby making the network with remarkable expandability and operability.

In accordance with some embodiments of the present invention, each AAA proxy server may initiate a session related request to the terminal or destination AAA server according to the routing table and the practical service requirement, thereby improving the manageability of the service and giving the invention remarkable flexibility.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
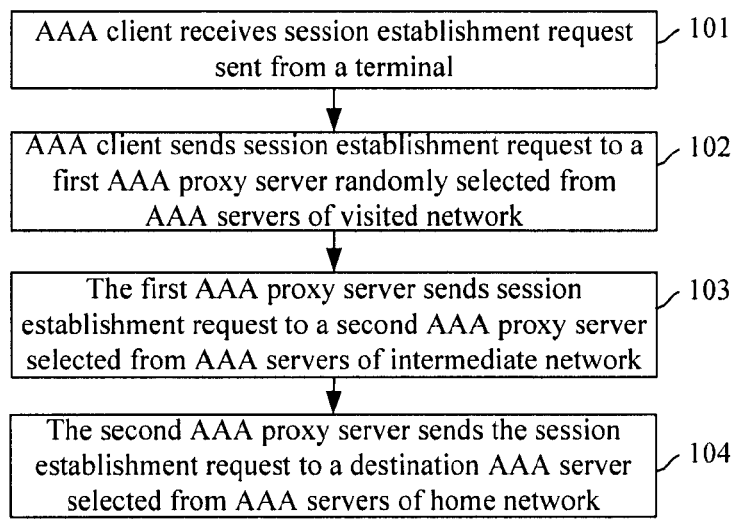
FIG. 1 is a simplified conventional flowchart illustrating the process of sending a session establishment request in a related art.

The following description is merely exemplary in nature and is not intended to limit the present disclosure, application, or uses. It should be understood that throughout the drawings, corresponding reference numerals indicate like or corresponding parts and features.

In embodiments of the present invention, acquiring routing information of a session and transferring session requests of the session according to the routing information.

There are two implementations as described bellow:

Implementation 1: pre-configure, at an AAA client of any network, a routing table which records a route from the AAA client to a destination AAA server of other networks, i.e. the routing table records address information of each AAA proxy server between the AAA client and the destination AAA server; when receiving each session request of a session sent from the terminal and aiming at the destination AAA server, the AAA client acquires the routing table pre-configured in the AAA client to determine the routing information for sending, i.e. the address information of the AAA proxy server of the next hop, and the routing table pre-configured is contained in each session request of the session; in this way, each AAA proxy server may acquire the routing information according to the routing table contained in the received session request, i.e. the address information of the AAA proxy server of the next hop up to the destination AAA server, so that all session requests of the session are ensured to be transferred through the same route.

Implementation 2: address information of each AAA proxy server is wrote in a session establishment request by each AAA proxy server upon receiving a session establishment request, respectively, and finally a routing table recording the routing information of the session establishment request is formed. When a subsequent request of this session is sent, an AAA client of a visited network of a terminal, an AAA server of a home network of the terminal and each other AAA proxy server acquire a route for sending each session request of this session according to the formed routing table, so that all session requests of the same session is ensured to be transferred via the same route.

The present invention will be described in detail hereinafter with reference to the accompanying drawings and embodiments, so as to make the technical solution and merits of the present invention more apparent.

Suppose that the implementation 2 is taken and there are two intermediate networks between the visited network and the home network of the terminal, then the method is implemented as follows.

Figure 2:
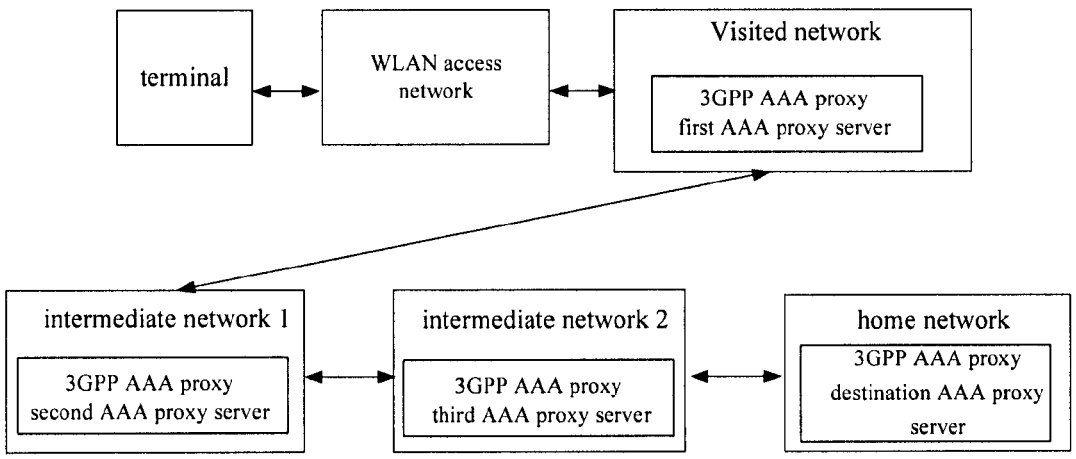
FIG. 2 is a schematic diagram illustrating a reference model for WLAN and 3G interworking when a terminal roams.
Figure 3:
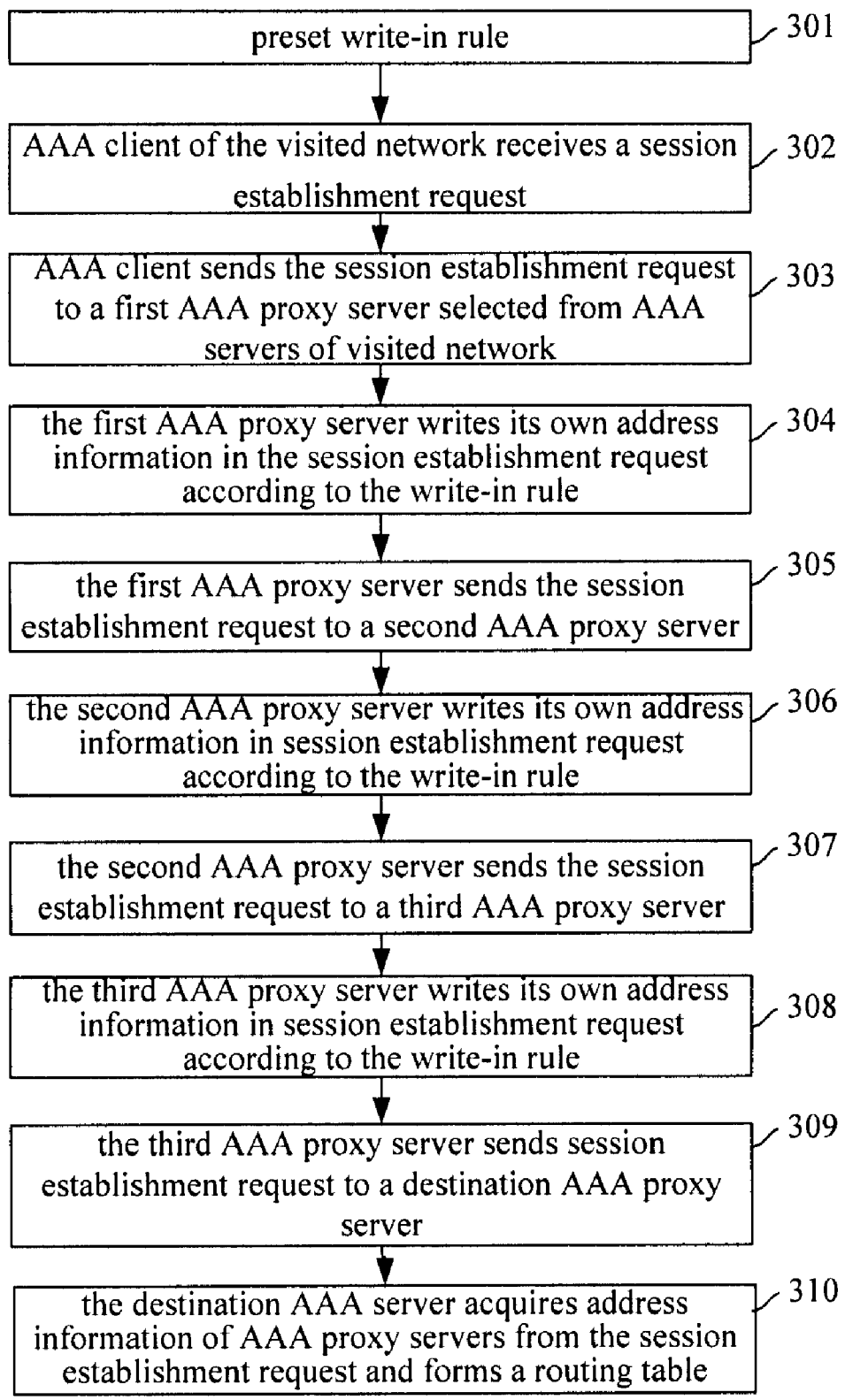
FIG. 3 is a flowchart illustrating the process of transferring a session establishment request according to an embodiment of the present invention.

FIG. 2 is a schematic diagram illustrating a reference model for WLAN and 3G interconnecting when a terminal roams. FIG. 3 is a flowchart illustrating the process of transferring a session establishment request according to an embodiment of the present invention. Referring to FIG. 2 and FIG. 3, when the terminal roams and needs to establish a session connection, the process of transferring a session establishment request includes the following steps:

Step 301: preset a write-in rule.

Herein, the write-in rule is preset so that each AAA proxy server in the subsequent process successively writes its own address information in the session establishment request according to the preset write-in rule. For example, the write-in rule may be writing in successively in a backward or forward order. Suppose that the write-in rule is writing in successively in the forward order, the subsequent process according to the embodiment of the present invention is implemented as follows.

Step 302: the AAA client of the visited network of a terminal receives the session establishment request sent from the terminal.

Step 303: the AAA client selects a first AAA proxy server from the AAA servers of the visited network, and sends the session establishment request to the first AAA proxy server.

Step 304: upon receiving the session establishment request, the first AAA proxy server writes address information of the first AAA proxy server in the session establishment request according to the write-in rule.

Herein, the address information may be the information for uniquely identifying the first AAA proxy server such as the host name or port number of the first AAA proxy server.

In addition, since the write-in rule is writing in successively in the forward order as supposed, the first AAA proxy server writes the address information of the first AAA proxy server at the first location in the session establishment request.

Step 305: the first AAA proxy server selects a second MA proxy server from the AAA servers of the intermediate network 1 connected with the first AAA proxy server, and sends the session establishment request to the second AAA proxy server.

Step 306: upon receiving the session establishment request, the second AAA proxy server writes address information of the second AAA proxy server in the session establishment request according to the write-in rule.

Herein, since the write-in rule is writing in successively in the forward order as supposed, the second AAA proxy server writes the address information of the second AAA proxy server at the location that follows the address information of the first AAA proxy server in the session establishment request.

Step 307: the second AAA proxy server selects a third AAA proxy server from the AAA servers of the intermediate network 2 connected with the second AAA proxy server, and sends the session establishment request to the third AAA proxy server.

Step 308: upon receiving the session establishment request, the third AAA proxy server writes address information of the third AAA proxy server in the session establishment request according to the write-in rule.

Herein, since the write-in rule is writing in successively in the forward order as supposed, the third AAA proxy server writes the address information of the third AAA proxy server at the location that follows the address information of the second AAA proxy server in the session establishment request.

Step 309: the third AAA proxy server selects a destination AAA server from the AAA servers of the home network of the terminal, and sends the session establishment request to the destination AAA server.

Step 310: upon receiving the session establishment request, the destination AAA server acquires the address information of all the AAA proxy servers from the session establishment request and forms the routing table.

The routing table formed by the destination AAA server may be as shown in Table 1.

TABLE 1

The first AAA proxy server
The second AAA proxy server
The third AAA proxy server It should be noted that in the process of transferring a session establishment request as shown in FIG. 3, the first, second and third AAA proxy server will correspondingly maintain the state of this session correspondingly when they receive the session establishment request, i.e. create this session.

Figure 4:
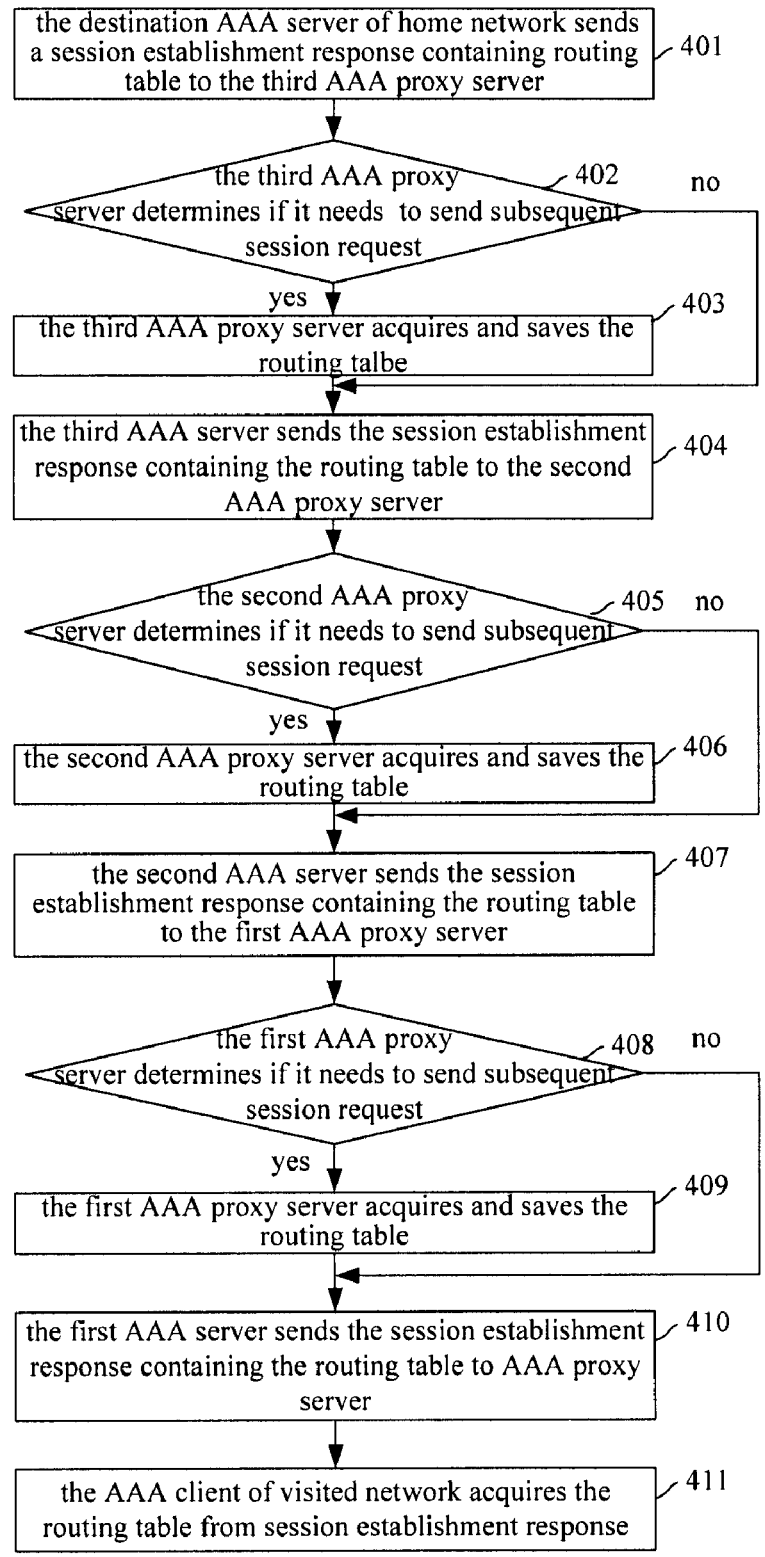
FIG. 4 is a flowchart illustrating the process for an AAA client to acquire a routing table according to an embodiment of the present invention.

After the destination AAA server of the home network of the terminal acquires the routing table, i.e. the address information of the AAA proxy servers corresponding to the session establishment request, in order to ensure that all the subsequent requests are transferred through the same AAA proxy servers corresponding to the session establishment request, to ensure that each AAA proxy server may maintain a correct session state, the AAA client of the visited network of the terminal must acquire the formed routing table as well. Therefore, according to the embodiment of the present invention, the destination AAA server of the home network of the terminal sends the routing table to the AAA client of the visited network of the terminal by transferring existing session establishment response containing the routing table or by transferring existing or self-defined messages containing the routing table. Referring to FIGS. 2 and FIG. 4, suppose the routing table is contained in the existing session establishment response, the process for the AAA client to acquire the routing table includes the following steps.

Step 401: the destination AAA server of the home network of the terminal sends the session establishment response containing the routing table to the third AAA proxy server of the intermediate network 2 connected with the destination AAA server.

Herein, since one session request and the response thereof may be ensured to be transferred via the same route so far, the destination AAA server of the home network of the terminal and the AAA proxy servers in the subsequent process may all accurately send the session establishment response containing the routing table to the next hop of the network.

Step 402: the third AAA proxy server determines whether the third AAA proxy server needs to initiate a subsequent request, if the third AAA proxy server needs to initiate a subsequent request, perform step 403; otherwise, go to perform step 404.

Herein, the third AAA proxy server determines whether the third AAA proxy server needs to initiate a subsequent session request by determining whether the third AAA proxy server needs to control the subsequent session, e.g. whether the third AAA proxy server needs to terminate the session, modify the session or the like.

Step 403: the third AAA proxy server acquires the routing table from the received session establishment response and saves the routing table.

Herein, since the third AAA proxy server in the subsequent process may initiate a subsequent session request of this session to the terminal side or to the destination AAA server by using the routing table, the third AAA proxy server may split the routing table into a routing table of the third AAA proxy server to the destination AAA server and a routing table of the third AAA proxy server to the terminal side, and save them according to the preset write-in rule. Since the write-in rule is writing successively in the forward order as supposed, the routing table of the third AAA proxy server to the destination AAA server saved by the third AAA proxy server includes the record of the third AAA proxy server to the last record, i.e. the record of the third AAA proxy server; and the routing table of the third AAA proxy server to the terminal side saved by the third AAA proxy server includes the record of the third AAA proxy server to the first record, i.e. the records of the third AAA proxy server, the second AAA proxy server and the first AAA proxy server.

Step 404: the third AAA proxy server sends the session establishment response containing the routing table to the second AAA proxy server of the intermediate network 1 connected with the third AAA proxy server.

Step 405: the second AAA proxy server determines whether the second AAA proxy server needs to initiate a subsequent request, if the second AAA proxy server needs to initiate a subsequent request, perform step 406; otherwise go to perform step 407.

Step 406: the second AAA proxy server acquires the routing table from the received session establishment response and saves the routing table.

Herein, the second AAA proxy server may also split the routing table into two parts accordingly, i.e. save the contents of the routing table from the record of the second AAA proxy server to the last record as a routing table of the second AAA proxy server to the destination AAA server, i.e. the second AAA proxy server and the third AAA proxy server, and save the contents of the routing table from the record of the second AAA proxy server to the first record as a routing table of the second AAA proxy server to the terminal side, i.e. the second AAA proxy server and the first AAA proxy server.

Step 407: the second AAA proxy server sends the session establishment response containing the routing table to the first AAA proxy server of the visited network of the terminal.

Step 408: the first AAA proxy server determines whether the first AAA proxy server needs to initiate a subsequent request, if the first AAA proxy server needs to initiate a subsequent request, perform step 409; otherwise, go to perform step 410.

Step 409: the first AAA proxy server acquires the routing table from the received session establishment response and saves the routing table.

Herein, the first AAA proxy server may also split the routing table into two parts accordingly, i.e. save the contents of the routing table from the record of the first AAA proxy server to the last record as a routing table of the first AAA proxy server to the destination AAA server, i.e. the first AAA proxy server, the second AAA proxy server and the third AAA proxy server, and save the contents of the routing table from the record of the first AAA proxy server to the first record as a routing table of the first AAA proxy server to the terminal side, i.e. the first AAA proxy server.

Step 410: the first AAA proxy server sends the session establishment response containing the routing table to the AAA client of the visited network of the terminal.

Step 411: the AAA client of the visited network of the terminal acquires the routing table from the received session establishment response.

Herein, the routing table acquired by the AAA client of the visited network of the terminal is as shown in Table 1, i.e. the first AAA proxy server, the second AAA proxy server and the third AAA proxy server.

Thus, the information of the AAA servers corresponding to the first session request of the session, i.e. the information of the AAA servers corresponding to the session establishment request, is saved by the AAA client of the visited network of the terminal and the destination AAA server of the home network of the terminal according to the embodiment of the present invention. In addition, routing tables are enabled to be saved as well in each AAA proxy server needing to initiate a subsequent session request according to the embodiment of the invention. Therefore, in the subsequent session process, each AAA proxy server with the saved routing table may initiate a subsequent request related to this session to the terminal side or to the destination AAA server according to the routing tables they save, and the AAA client and the destination AAA server of the home network of the terminal may initiate a subsequent request related to this session to the destination AAA server or the terminal side according to the saved routing table, respectively. All the requests related to this session from the first session establishment request of this session to the last session termination request are enabled to be transferred via the same AAA servers, so that each AAA proxy server may be ensured to maintain a correct session state.

Figure 5:
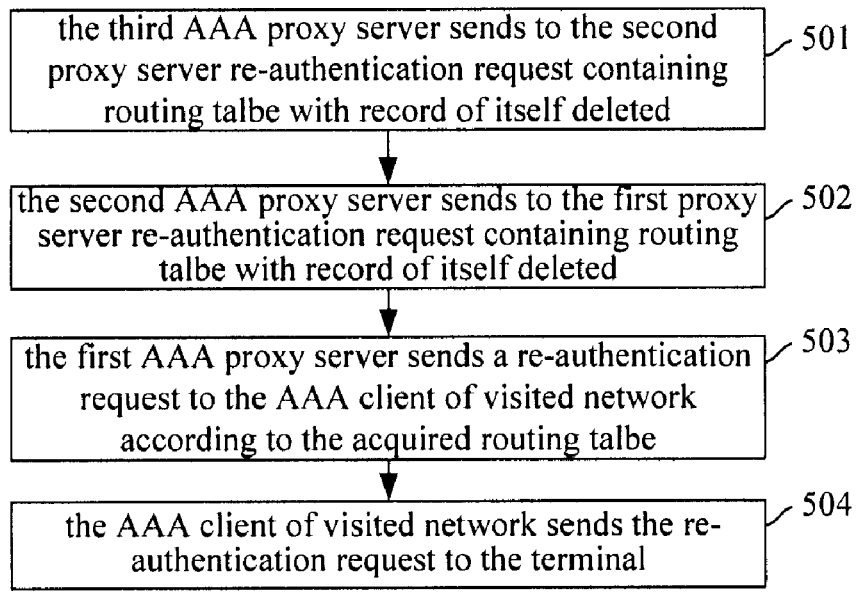
FIG. 5 is a flowchart illustrating the process for an AAA proxy server initiating a subsequent request related to the session according to an embodiment of the present invention.

FIG. 5 is a flowchart illustrating the process of initiating a re-authentication request by an AAA proxy server. Referring to FIG. 2 and FIG. 5, taking the third AAA proxy server as an example, when the third AAA proxy server detects a time-out in this session and a need for re-authenticating the terminal, the third AAA proxy server initiates a request related to this session, i.e. a re-authentication request to the terminal side. The implementation process includes the following steps.

Step 501: when detects a time-out in this session, the third AAA proxy server deletes the record of the third AAA proxy server from the routing table, and sends to the second AAA proxy server the re-authentication request containing the routing table with the record of the third AAA proxy server deleted.

Herein, since the routing table of the third AAA proxy server to the terminal saved by the third AAA proxy server includes the record of the third AAA proxy server, the second AAA proxy server and the first AAA proxy server; the third AAA proxy server may learn that the re-authentication request should be sent to the second proxy server. In addition, after the record of the third AAA proxy server is deleted, the routing table contained in the re-authentication request includes the records of the second AAA proxy server and the first AAA proxy server.

Step 502: the second AAA proxy server acquires the routing table from the received re-authentication request, deletes the record of the second AAA proxy server, and sends to the first AAA proxy server the re-authentication request containing the routing table with the record of the second AAA proxy server deleted.

Herein, since the routing table acquired by the second AAA proxy server includes the records of the second AAA proxy server and the first AAA proxy server, the second AAA proxy server may learn that the re-authentication request should be sent to the first AAA proxy server. In addition, after the record of the second AAA proxy server is deleted, the routing table contained in the re-authentication request includes the record of the first AAA proxy server.

Step 503: the first AAA proxy server sends the re-authentication request to the AAA client of visited network, according to the routing table acquired from the received re-authentication request.

Herein, since the routing table acquired by the first AAA proxy server includes record of the first AAA proxy server only, the first AAA proxy server may learn that the network where it is located is the network of the visited network of the terminal, and accordingly sends the re-authentication request to the AAA client of this network, i.e. the AAA client of the visited network of the terminal. In addition, in this step, since the routing table acquired by the first AAA proxy server only includes the record of the first AAA proxy server, the first AAA proxy server may delete the routing table, i.e. the re-authentication request sent from the first AAA proxy server to the AAA client no longer includes the routing table.

Step 504: the AAA client of the visited network of the terminal sends the re-authentication request to the terminal.

Figure 6:
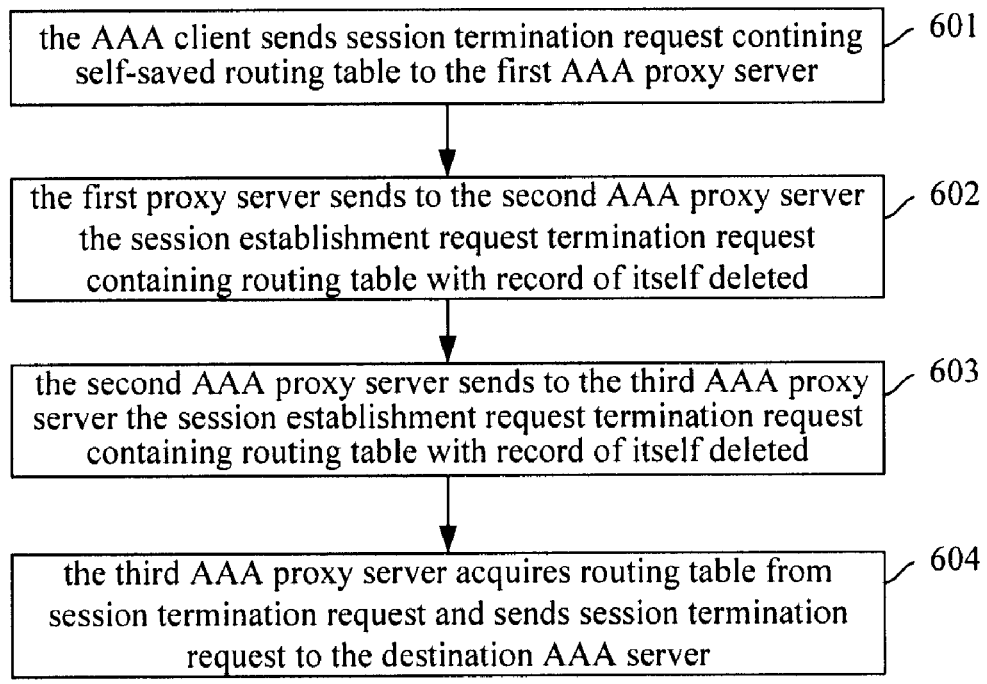
FIG. 6 is a flowchart illustrating the process of transferring a session termination request according to an embodiment of the present invention.

FIG. 6 is a flowchart illustrating the process of transferring a session termination request according to an embodiment of the present invention. Referring to FIG. 2 and FIG. 6, in this embodiment, the process of sending the subsequent request related to this session, i.e. the session termination request, by the terminal includes the following steps.

Step 601: when receiving the session termination request sent from the terminal, the AAA client of the visited network of the terminal sends to the first AAA proxy server, according to the routing table saved in the AAA client, the session termination request including the routing table saved in the AAA client.

Herein, the routing table saved in the AAA client and included in the session termination request is as shown in Table 1, i.e. the records of the first AAA proxy server, the second AAA proxy server, the third AAA proxy server; the AAA client therefore may learn, according to the routing table, that the session termination request should be sent to the first proxy server.

Step 602: the first AAA proxy server acquires the routing table from the session termination request, deletes the record of the first AAA proxy server from the routing table, and sends to the second AAA proxy server the session termination request containing the routing table with the record of the first AAA proxy server deleted.

Herein, the routing table acquired by the first AAA proxy server includes the records of the first AAA proxy server, the second AAA proxy server, the third AAA proxy server; the first AAA proxy server deletes the first record from the routing table because the first record is the record of the first AAA proxy server. In this way, the routing table included in the session termination request includes the records of the second AAA proxy server and the third AAA proxy server; and the first AAA proxy server may learn, according to the routing table, that the session termination request should be sent to the second AAA proxy server.

Step 603: the second AAA proxy server acquires the routing table from the session termination request, deletes the record of the second AAA proxy server from the routing table, and sends to the third AAA proxy server the session termination request including the routing table with the record of the second AM proxy server deleted.

Herein, the routing table acquired by the second AM proxy server includes the records of the second MA proxy server, the third AM proxy server. The second MA proxy server deletes the first record from the routing table because the first record is the record of the second MA proxy server. In this way, the routing table included in the session termination request only includes the record of the third AAA proxy server; and the second AAA proxy server may learn, according to the routing table, that the session termination request should be sent to the third AAA proxy server.

Step 604: the third AAA proxy server acquires the routing table from the session termination request, and sending the session termination request to the destination AAA server.

Herein, the routing table acquired by the third AAA proxy server only includes the record of the third AAA proxy server, so the third AAA proxy server may learn that the session termination request should be sent to the destination AAA server. In addition, in this step, since the routing table acquired by the third AAA proxy server only includes the record of the third AAA proxy server, the third AAA proxy server may delete the routing table, i.e. the routing table is no longer contained in the session termination request sent from the third AAA proxy server to the destination AAA server.

It should be noted that, when the subsequent request related to this session is transferred as shown in FIG. 5 and FIG. 6, upon receiving the corresponding session request, each AAA proxy server will correspondingly modify the state of this session it maintains, so that a correct state of the session and a proper service processing may be ensured. For example, in the process as shown in FIG. 6, when receiving the session termination request, the first, the second and the third AAA proxy servers respectively convert the state of this session into "termination" to ensure the correctness of the session state. In this way, the first, the second and the third AAA proxy servers may implement proper session related processing according to the correct session state, such as release the resources occupied by this session, and generate correct charging information and the like.

In the above embodiments, the routing table may be modified according to the actual requirement of service. In another word, when receiving a session request or session response of this session which contains the routing table, if an AAA proxy server hopes that the subsequent session related request will not be forwarded by itself again, the AAA proxy server may delete its own address information from the routing table before sending the session request or session response. In this way, when the subsequent session related request is transferred, in other networks, the routing table is still transferred by the original AAA proxy servers; in the network of which the AAA proxy server is deleted, another AAA proxy server is selected; and the address information of the AAA proxy server selected is added to the location corresponding to the AAA proxy server deleted in the routing table so that a new routing table is formed; then the new routing table is sent to the other side via a response message; in the subsequent process, the new routing table is used for transferring the subsequent request of this session.

Furthermore, based on the implementing procedure of the above embodiment of the present invention, i.e. a routing table has been saved in the AAA client, when the AAA client receives a session establishment request of another session, if the home network of the terminal corresponding to the another session is the same as the home network of the terminal corresponding to the saved routing table, i.e. the visited networks and the home networks for the two sessions are the same respectively, the AAA client may add the saved routing table into the session establishment request of the another session. In this way, the AAA client and all the AAA proxy servers of the network transfer the session establishment request of the another session according to the routing table contained in the session establishment request of the another session, in addition, the subsequent session request related to the another session is also transferred according to such a routing table, so that all session requests related to the another session may be transferred via the same route.

In the above embodiment of the present invention, the type of each session request and session request response may be any of the AAA protocol messages, such as the Diameter or Radius protocol message. When a routing table is formed by writing in address information, the process may be implemented by adding a parameter to the session establishment request of the AAA protocol. For example, a parameter Route-List may be added to the Radius protocol's message and each AAA proxy server writes its own address information successively in the segment corresponding to the parameter Route-List; therefore, the subsequent process of acquiring the routing table may be implemented via the parameter Route-List.

In the above embodiment of the present invention, the implementing procedure is described by supposing that there are two intermediate networks between the visited network and the home network of the terminal. In practice, there may be more or less intermediate networks or no intermediate network between the visited network and the home network of the terminal, but the principle for implementation is the same as that of the above embodiment.

The foregoing is only preferred embodiments of the present invention and is not for use in limiting the protection scope thereof. Any modification, equivalent substitution, improvement within the spirit and principle of the invention should be covered in the protection scope of the invention.

What is claimed is:

1. A method for transferring a session request, comprising:

acquiring, by an Authentication, Authorization and Accounting, AAA, client in a visited network of a terminal, a routing table related to a session; wherein the routing table is generated during transferring a session establishment request of the session and records the address information of at least one Authentication, Authorization and Accounting (AAA) proxy server between the AAA client in the visited network of the terminal and a destination AAA server in a home network of the terminal;

transferring, by the AAA client of the visited network of the terminal, the session request of the session carrying the routing table to a first AAA proxy server of the visited network of the terminal according to the address information of the first AAA proxy server recorded in the routing table upon receiving the session request of the session sending from the terminal;

acquiring, by the first AAA proxy server of the visited network of the terminal, a route for sending the session request of the session, according to the routing table carried in the received session request;

transferring, by the first AAA proxy server of the visited network of the terminal, the session request of the session carrying the routing table to the AAA proxy server of the intermediate network or the destination AAA server of the home network of the terminal, according to the route for sending the session request of the session; and transferring all session requests of another session between the AAA client and the destination AAA server through the AAA proxy server according to the routing table related to the session, wherein the another session and the session relate to the same visited network of the terminal and the same home network of the terminal.

2. The method of claim 1, wherein the step of generating the routing table related to the session during transferring a session establishment request of the session comprises:

sending, by the AAA client of the visited network of the terminal, a session establishment request of the session to a first AAA proxy server selected from the visited network of the terminal upon receiving the session establishment request of the session from the terminal;

writing, by the first AAA proxy server of the visited network of the terminal, the address information of the first AAA proxy server in the session establishment request of the session, and sending the session establishment request of the session to the destination AAA server selected of the home network of the terminal;

saving, by the destination AAA server of the home network of the terminal, the address information of the first AAA proxy server as the routing table related to the session;

sending, by the destination AAA server of the home network of the terminal, the routing table related to the session to the AAA client of the visited network of the terminal;

saving, by the AAA client of the visited network of the terminal, the routing table related to the session.

3. The method of claim 2, wherein the step of sending by the destination AAA server of the home network of the terminal the routing table related to the session to the AAA client of the visited network of the terminal comprises:

sending, by the destination AAA server of the home network of the terminal, the routing table to the first AAA proxy server of the visited network of the terminal according to the address information of the first AAA proxy server recorded in the routing table;

sending, by the first AAA proxy server of the visited network of the terminal, the routing table related to the session to the AAA client of the visited network of the terminal.

4. The method of claim 2, wherein the step of sending by the destination AAA server of the home network of the terminal the routing table related to the session to the AAA client of the visited network of the terminal comprises:

sending, by the destination AAA server of the home network of the terminal, a session establishment response of the session or other self-defined messages carrying the routing table related to the session to the AAA client of the visited network of the terminal.

5. The method of claim 2, further comprising:

sending, by the destination AAA server of the home network of the terminal, the session request of the session to the first AAA proxy server of the visited network of the terminal according to the address information of the first AAA proxy server recorded in the routing table related to the session;

sending, by the first AAA proxy server of the visited network of the terminal, the session request of the session to the AAA client of the visited network of the terminal.

6. The method of claim 1, wherein there is an intermediate network between the visited network of the terminal and the home network of the terminal, the step of acquiring the routing table related to the session comprises:

sending, by the AAA client of the visited network of the terminal, the session establishment request of the session to a first AAA proxy server selected from the visited network of the terminal upon receiving the session establishment request of the session from the terminal;

writing, by the first AAA proxy server of the visited network of the terminal, the address information of the first AAA proxy server in the session establishment request of the session, and sending the session establishment request of the session to an AAA proxy server selected from the intermediate network;

writing, by the AAA proxy server of the intermediate network, the address information of the AAA proxy server of the intermediate network in the session establishment request, and sending the session establishment request to a destination AAA server selected from the home network of the terminal;

saving, by the destination AAA server of the home network of the terminal, the address information of the first AAA proxy server and the address information of the AAA proxy server of the intermediate network as the routing table related to the session;

sending, by the destination AAA server of the home network of the terminal, the routing table related to the session to the AAA client of the visited network of the terminal;

saving, by the AAA client of the visited network of the terminal, the routing table related to the session.

7. The method of claim 6, wherein the intermediate network comprises one or more intermediate networks, and the step of writing by the AAA proxy server of the intermediate network the address information of the AAA proxy server of the intermediate network in the session establishment request and sending the session establishment request to the destination AAA server of the home network of the terminal comprises:

writing, by an AAA proxy server of each intermediate network, the address information of itself in the session establishment request of the session upon receiving the session establishment request of the session, and sending the establishment request of the session to one of an AAA proxy server of a next intermediate network and the destination AAA server of the home network of the terminal.

8. The method of claim 6, wherein the step of sending by the destination AAA server of the home network of the terminal the routing table related to the session to the AAA client of the visited network of the terminal comprises:

sending, by the destination AAA server of the home network of the terminal, the routing table related to the session to the AAA proxy server of the intermediate network according to the address information of the AAA proxy server of the intermediate network recorded in the routing table related to the session;

sending, by the AAA proxy server of the intermediate network, the routing table related to the session to the first AAA proxy server of the visited network of the terminal according to the address information of the first AAA proxy server recorded in the routing table related to the session;

sending, by the first AAA proxy server of the visited network of the terminal, the routing table related to the session to the AAA client of the visited network of the terminal.

9. The method of claim 8, wherein the step of writing the address information in the session establishment request comprises:
  writing the address information in the session establishment request successively in forward order;
  the step of writing the address information of the AAA proxy server of the intermediate network in the session establishment request comprises:
  writing, by the AAA proxy server of the intermediate network, the address information of the AAA proxy server of the intermediate network at the location that follows the address information of the first AAA proxy server in the session establishment request.

10. The method of claim 9, further comprising:
  upon receiving the routing table related to the session,
  saving, by the AAA proxy server of the intermediate network, the record of the address information of the AAA proxy server of the intermediate network to a last record of the routing table as a first routing table from the AAA proxy server of the intermediate network to the destination AAA server of the home network of the terminal, and saving the record of the address information of the AAA proxy server of the intermediate network to a first record of the routing table as a second routing table from the AAA proxy server of the intermediate network to the AAA client of the visited network of the terminal.

11. The method of claim 10, further comprising:
  if the AAA proxy server of the intermediate network initiates a re-authentication request of the session to the destination AAA server of the home network of the terminal, sending the re-authentication request of the session to the destination AAA server of the home network of the terminal according to the first routing table;
  if the AAA proxy server of the intermediate network initiates a re-authentication request of the session to the AAA client of the visited network of the terminal, sending the re-authentication request of the session to the AAA client of the visited network of the terminal according to the second routing table.

12. The method of claim 9, further comprising:
  upon receiving the routing table related to the session,
  saving, by the first AAA proxy server of the visited network of the terminal, the record of the address information of the first AAA proxy server to a last record of the routing table as a third routing table from the first AAA proxy server of the visited network of the terminal to the destination AAA server of the home network of the terminal, and saving the record of the address information of the first AAA proxy server to a last record of the routing table as a fourth routing table from the first AAA proxy server of the visited network of the terminal to the AAA client of the visited network of the terminal.

13. The method of claim 12, further comprising:
  if the first AAA proxy server of the visited network of the terminal initiates a re-authentication request of the session to the destination AAA server, sending the re-authentication request of the session to the destination AAA server of the home network of the terminal according to the third routing table;
  if the first AAA proxy server of the visited network of the terminal initiates a re-authentication request of the session to the AAA client of the visited network of the terminal, sending the re-authentication request of the session to the AAA client of the visited network of the terminal according to the fourth routing table.

14. The method of claim 6, further comprising:
  sending, by the destination AAA server of the home network of the terminal, the session request of the session carrying the routing table related to the session to the AAA proxy server of the intermediate network according to the address information of the AAA proxy server of the intermediate network recorded in the routing table related to the session;
  sending, by the AAA proxy server of the intermediate network, the session request of the session carrying the routing table related to the session to the first AAA proxy server of the visited network of the terminal according to the address information of the first AAA proxy server recorded in the routing table related to the session;
  sending, by the first AAA proxy server of the visited network, the session request of the session carrying the routing table related to the session to the AAA client of the visited network of the terminal.

15. The method of claim 6, the step of transferring, by the first AAA proxy server of the visited network of the terminal, the session request of the session carrying the routing table to the AAA proxy server of the intermediate network or the destination AAA server of the home network of the terminal, according to the route for sending the session request of the session comprises:
  sending, by the first AAA proxy server of the visited network of the terminal, the session request of the session carrying the routing table related to the session to the AAA proxy server of the intermediate network according to the address information of the AAA proxy server of the intermediate network recorded in the routing table related to the session;
  sending, by the AAA proxy server of the intermediate network, the session request of the session carrying the routing table related to the session to the destination AAA server of the home network.

16. The method of claim 1, further comprising:
  deleting, by the AAA proxy server, the address information of the AAA proxy server from the routing table related to the session upon receiving the session request of the session carrying the routing table related to the session.

17. The method of claim 1, further comprising:
  maintaining, by the AAA proxy server related to the session, session state of the session according to the received session request of the session and making corresponding service processing according to the session state of the session.

18. The method of claim 2, further comprising:
  setting a route parameter in the session establishment request of the session;
  the step of writing address information in the session establishment request of the session comprising:
  writing address information in the segments corresponding to the route parameter of the session establishment request of the session.

19. The method of claim 1, wherein type of the session request of the session comprises one of a Diameter protocol and a remote authentication dial-in user service Radius protocol.

20. A system for transferring a session request, comprising:
  an Authentication, Authorization and Accounting (AAA) client of a visited network of a terminal, adapted to select an AAA proxy server and send a session establishment request of a session to the AAA proxy server upon receiving the session establishment request of the session from the terminal;

the AAA proxy server, adapted to acquire a routing table related to the session, send the session establishment request of the session carrying the routing table related the session to a destination AAA server of a home network of the terminal; wherein the routing table records the address information of the AAA proxy server itself;

the destination AAA server of the home network of the terminal, adapted to save the routing table related to the session and recording the address information of the AAA proxy server between the AAA client in the visited network of the terminal and the destination AAA server in the home network of the terminal, and send the routing table related to the session to the AAA client of the visited network of the terminal;

the AAA client of the visited network of the terminal, the AAA proxy server and the destination AAA server of the home network of the terminal further adapted to transfer other session request of the session carrying the routing table to the next hop according the address information of the AAA proxy server recorded in the routing table related to the session upon receiving the other session request of the session; and the AAA client of the visited network of the terminal, the AAA proxy server and the destination AAA server of the home network of the terminal further adapted to transfer all session requests of another session according to the routing table related to the session, wherein the another session and the session relate to the same visited network of the terminal and the same home network of the terminal.

21. The system of claim 20, wherein the AAA proxy server comprises:

a first AAA proxy server of the visited network of the terminal, adapted to write the address information of the first AAA proxy server of the visited network of the terminal in the session establishment request of the session, upon receiving the session establishment request of the session sent from the AAA client of the visited network of the terminal, and send the session establishment request of the session to the destination AAA server of the home network of the terminal;

the destination AAA server of the home network of the terminal comprises a first destination AAA server, adapted to save the address information of the first AAA proxy server of the visited network of the terminal as the routing table related to the session, and send the routing table related to the session to the AAA client of the visited network of the terminal.

22. The system of claim 20, wherein the AAA proxy server comprises:

a first AAA proxy server of the visited network of the terminal, adapted to write the address information of the first AAA proxy server of the visited network of the terminal in the session establishment request of the session, upon receiving the session establishment request of the session sent from the AAA client of the visited network of the terminal, and send the session establishment request of the session to a selected AAA proxy server of an intermediate network;

the AAA proxy server of the intermediate network, adapted to write the address information of the AAA proxy server of the intermediate network in the session establishment request and send the session establishment request to the destination AAA server of the home network of the terminal;

the destination AAA server of the home network of the terminal comprises a second destination AAA server, adapted to save the address information of the first AAA proxy server of the visited network of the terminal, the address information of the AAA proxy server of the intermediate network as the routing table related to the session;

and sending the routing table related to the session to the AAA client of the visited network of the terminal.

23. An Authentication, Authorization and Accounting (AAA) proxy server of a first network, comprising:

a first component adapted to:

write the address information of the AAA proxy server upon receiving a session establishment request of a session; and select one of an AAA proxy server of a second network, and a destination AAA server of a home network of a terminal, and send the session establishment request of the session with the address information of the AAA proxy server written to the one of the AAA proxy server of the second network and the destination AAA server; and select one of the AAA proxy server of the second network, an AAA client of a visited network of the terminal and the destination AAA server of the home network of the terminal according to the address information of the AAA proxy server recorded in a routing table related to the session upon receiving other session request of the session carrying the routing table related to the session, and send the other session request of the session to the one of the AAA proxy server of the second network, the AAA client and the destination AAA; and transfer all session requests of another session between the AAA client and the destination AAA server through the AAA proxy server according to the routing table related to the session, wherein the another session and the session relate to the same visited network of the terminal and the same home network of the terminal.

24. The AAA proxy server of claim 23, further comprising: a second component adapted to:

save the routing table related to the session as a first routing table from the AAA proxy server to the AAA client, and a second routing table from the AAA proxy server to the destination AAA server, upon receiving a session request of the session carrying the routing table related to the session; and initiate a session request of the session to the AAA client or to the destination AAA server respectively according to the first routing table or the second routing table.

25. The AAA proxy server of claim 23, further comprising: a third component adapted to:

delete the address information of the AAA proxy server from the routing table upon receiving the session request of the session carrying the routing table, and send the session request of the session carrying the routing table with the address information of the AAA proxy server deleted to one of the AAA proxy server of the second network, the AAA client and the destination AAA server according to the routing table.

* * * * *